United States Patent
Ono et al.

(10) Patent No.: US 8,550,394 B2
(45) Date of Patent: Oct. 8, 2013

(54) WEBBING TAKE-UP DEVICE

(75) Inventors: Takashi Ono, Aichi-ken (JP); Akira Sumiyashiki, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 284 days.

(21) Appl. No.: 13/116,788

(22) Filed: May 26, 2011

(65) Prior Publication Data
US 2011/0290928 A1    Dec. 1, 2011

(30) Foreign Application Priority Data
May 28, 2010   (JP) .................................. 2010-123408

(51) Int. Cl.
*B65H 75/48*   (2006.01)
(52) U.S. Cl.
USPC .......................................... 242/376; 242/382
(58) Field of Classification Search
USPC .................................................. 242/376, 382
See application file for complete search history.

(56) References Cited

U.S. PATENT DOCUMENTS

| 3,952,967 A | * | 4/1976 | Barile et al. | 242/379.1 |
| 4,385,736 A | * | 5/1983 | Yamamoto | 242/376 |
| 4,623,104 A | * | 11/1986 | Mori | 242/376 |
| 5,630,561 A | * | 5/1997 | Ogawa et al. | 242/376 |

FOREIGN PATENT DOCUMENTS

JP    3-076877    11/1989

* cited by examiner

*Primary Examiner* — Sang Kim
(74) *Attorney, Agent, or Firm* — Roberts Mlotkowski Safran & Cole, P.C.

(57) ABSTRACT

In an insertion hole formed in an adapter, a side wall which presses an insertion piece of a stopper with an urging force of a spiral spring has a wall surface parallel to a virtual straight line passing a center of the adapter and positioned on the virtual straight line. Thus, a direction which the wall surface of the side wall presses the insertion piece of the stopper is along a facing direction which the side wall and another side wall face each other, and is not inclined outward in a radial direction of the adapter with respect to the facing direction. Thereby, a pressing force applied from the wall surface of the side wall to the insertion piece of the stopper does not cause the insertion piece to be extruded from the insertion hole. Thus, insertion state of the insertion piece to the insertion hole can be satisfactorily maintained.

10 Claims, 5 Drawing Sheets

WEBBING TAKE-UP DEVICE

CROSS-REFERENCE TO RELATED APPLICATION

This application claims priority under 35 USC 119 from Japanese Patent Application No. 2010-123408 filed May 28, 2010, the disclosure of which is incorporated by reference herein.

BACKGROUND OF THE INVENTION

1. Field of the Invention

The present invention relates to a webbing take-up device which takes up a webbing belt for restraining a passenger's body with an urging force of an urging section such as a spiral coil and stores the webbing belt therein.

2. Related Art

In a webbing take-up device disclosed in Japanese Utility Model Application Laid-open No. 03-76877 (hereinafter, refer to as Patent Document 1), a cutout portion is formed in a peripheral wall provided upright toward a case side from an outer peripheral portion of a flange portion of an adapter (referred to as "shaft body" in Patent Document 1). When a neck of a stopper (referred to as "pin" in Patent Document 1) is positioned correspondingly to the cutout portion, an end portion of the cutout portion of the peripheral wall enters an inside of the neck portion. In this manner, rotation, which is caused by an urging force of a power spring, of the adapter is regulated.

In such a structure, the end portion of the cutout portion of the peripheral wall has entered the inside of the neck portion of the stopper. Thus, when taking out the stopper, it is necessary to push and press, against the urging force of the power spring, the end portion of the cutout portion of the peripheral wall toward a drawing-out-direction side with such a force as to pull out the stopper, and to cause the adapter to rotate to the drawing-out-direction side. For this reason, it is preferred to form both width-direction ends of the stopper in a linear shape without formation of the neck portion in the stopper. However, if both the width-direction ends of the stopper are formed in a linear shape as just described above, the urging force, which is received from the adapter, of the power spring may act so as to extrude the stopper from the cutout portion, thus it may lead to a risk of inadvertent stopper moving.

SUMMARY OF THE INVENTION

In consideration of the above-mentioned facts, the present invention has an object to provide a webbing take-up device capable of preventing or suppressing stopper from moving caused by the urging force of the urging section.

A webbing take-up device according to the first aspect of the present invention includes: a spool to which a base end side, of a webbing belt having a long belt shape, in a longitudinal direction of the webbing belt is coupled, the spool taking up the webbing belt from the base end side in the longitudinal direction by rotating in a take-up direction to store the webbing belt thereon, the take-up direction being one direction about an axis of the spool; an adapter to which the spool is coupled directly or indirectly at one end side in an axial direction of the spool so as to rotate integrally with the spool; an insertion portion formed in the adapter and having an opening opened at an outer peripheral portion of the adapter, and wall portions facing each other in a direction orthogonal to both of a rotation axis direction of the adapter and a direction from a rotation center of the adapter to the opening, rotation of the adapter being regulated by a stopper, that is inserted from the opening into the insertion portion, interfering with the wall portions; and an urging member whose one end is coupled to the adapter, that urges the adapter in the take-up direction with an urging force, the urging force being increased by the adapter being rotated in a drawing-out direction opposite to the take-up direction, wherein a center between one of the wall portions and the other of the wall portions of the insertion portion is offset toward the take-up direction side with respect to a virtual line passing through the rotation center of the adapter and the opening of the insertion portion.

In the webbing take-up device according to the first aspect of the present invention, the adapter is provided on the one end side in axial direction of the spool so that the adapter and the spool are directly or indirectly coupled to each other. Thereby, the spool and the adapter are coaxially and integrally rotated. Further, the one end of the urging member provided on the one end side of the spool is caught to the adapter. Thus, by drawing out the webbing belt from the spool, the adapter is rotated together with the spool in the drawing out direction, thus the urging force of the urging member is increased. The urging member urges the adapter in the take-up direction with this urging force, and urges the spool indirectly in the take-up direction. The spool is rotated in the take-up direction by the urging force, as a result, the webbing belt is taken up by the spool.

Meanwhile, in a case where the spool and the adapter are coupled to each other, the adapter is caused to rotate in the drawing-out direction so that the urging force in the take-up direction is generated in the urging member. Under a state in which the urging force is generated in the urging member described above, the stopper is inserted from the opening, which is at the outer peripheral portion of the adapter, of the insertion portion. The insertion portion is provided with the wall portions facing each other in the direction orthogonal to both the rotation axis direction of the adapter and the direction from the rotation center of the adapter to the opening of the insertion portion. The stopper inserted in the insertion portion interferes with at least the one, which is positioned on the drawing-out direction side, of the wall portions. Thereby, the rotation, which is caused by the urging force of the urging member, in the take-up direction of the adapter is regulated, and hence the adapter can be maintained under a state in which the urging force is generated in the urging member.

In this case, the center (center line) between the wall portions facing each other in the insertion portion described above is offset to the take-up direction side relative to the virtual line passing the rotation center of the adapter and the opening of the insertion portion. Thus, in comparison with a constitution in which the center between the wall portions and the virtual straight line coincide each other, when a rotational force in the take-up direction is applied to the adapter, a component, which is in a direction in which the stopper is extruded to an outside of the insertion portion, of a pressing force which causes the wall portion on the drawing-out direction side to press the stopper is reduced or eliminated. Thereby, the move of the stopper at the insertion portion caused by the urging force of the urging member can be prevented or suppressed.

The webbing take-up device according to the second aspect of the present invention is that, in the first aspect, one of the wall portions of the insertion portion, which is located at the drawing-out direction side, is formed on the virtual line or formed at a position further toward the take-up direction side than the virtual line.

In the webbing take-up device according to the second aspect of the present invention, the one of the wall portions of the insertion portions, which is located at the side of the drawing-out direction, facing each other in the insertion portion is formed on the virtual line passing the rotation center of the adapter and the opening of the insertion portion, or formed at the position further toward the side of the take-up direction than the virtual line. Thus, when the rotational force in the take-up direction is applied to the adapter, the component, which is in the direction in which the stopper is extruded to the outside of the insertion portion, of the pressing force which causes the wall portion on the drawing-out direction side to press the stopper is eliminated. Thereby, the move of the stopper at the insertion portion caused by the urging force of the urging member can be prevented or suppressed.

The webbing take-up device according to the third aspect of the present invention is that, in the first or the second aspect, the wall portions are formed parallel to the virtual line.

In the webbing take-up device according to the third aspect of the present invention, the wall portions facing each other in the insertion portion are formed parallel to the virtual line passing the rotation center of the adapter and the opening of the insertion portion. Incidentally, a direction of the pressing force which causes the wall portion on the drawing-out direction side to press the stopper is a tangential direction with respect to the rotation of the adapter at a forming position at which the wall portion is formed. Thus, by positioning the wall portion, which is on the drawing-out direction side, on a virtual-straight-line side, the component in the direction in which the stopper is extruded to the outside of the insertion portion is reduced or eliminated. Thereby, the stopper move at the insertion portion by the urging force of the urging member can be prevented or suppressed.

A webbing take-up device according to a fourth aspect of the present invention includes: a spool to which a base end side, of a webbing belt having a long belt shape, in a longitudinal direction of the webbing belt is coupled, the spool taking up the webbing belt from the base end side in the longitudinal direction by rotating in a take-up direction to store the webbing belt thereon, the take-up direction being one direction about an axis of the spool; an adapter to which the spool is coupled directly or indirectly at one end side in an axial direction of the spool so as to rotate integrally with the spool; an insertion portion formed in the adapter and having an opening opened at an outer peripheral portion of the adapter, and wall portions facing each other in a direction orthogonal to both of a rotation axis direction of the adapter and a direction from a rotation center of the adapter to the opening, rotation of the adapter being regulated by a stopper, that is inserted from the opening into the insertion portion, interfering with the wall portions; and an urging member whose one end is coupled to the adapter, that urges the adapter in the take-up direction with an urging force, the urging force being increased by the adapter being rotated in a drawing-out direction opposite to the take-up direction, wherein a center between one of the wall portions and the other of the wall portions of the insertion portion is offset toward the take-up direction side with respect to a virtual line which extends from the rotation center of the adapter toward a side of the opening of the insertion portion and is parallel to at least one of the wall portions.

The fourth aspect has the operations and the effects similar to those of the first aspect, and it is possible in the fourth aspect to have the similar structures of the second aspect and/or the third aspect.

Further, it is preferable in the above aspects that the rotation of the adapter in the take up direction is regulated due to the stopper, inserted from the opening into the insertion portion, interfering with the one of the wall portions, which is located at the drawing-out direction side.

As described hereinabove, the webbing take-up device according to the present invention is capable of preventing or suppressing stopper from moving caused by the urging force of the urging member.

BRIEF DESCRIPTION OF THE DRAWINGS

Embodiments of the invention will be described in detail with reference to the following figures, wherein:

FIG. 4A illustrates that of the embodiment and FIG. 4B illustrates that of the conventional structure.

DETAILED DESCRIPTION OF THE INVENTION

Structure of a Present Embodiment

Figure 3:
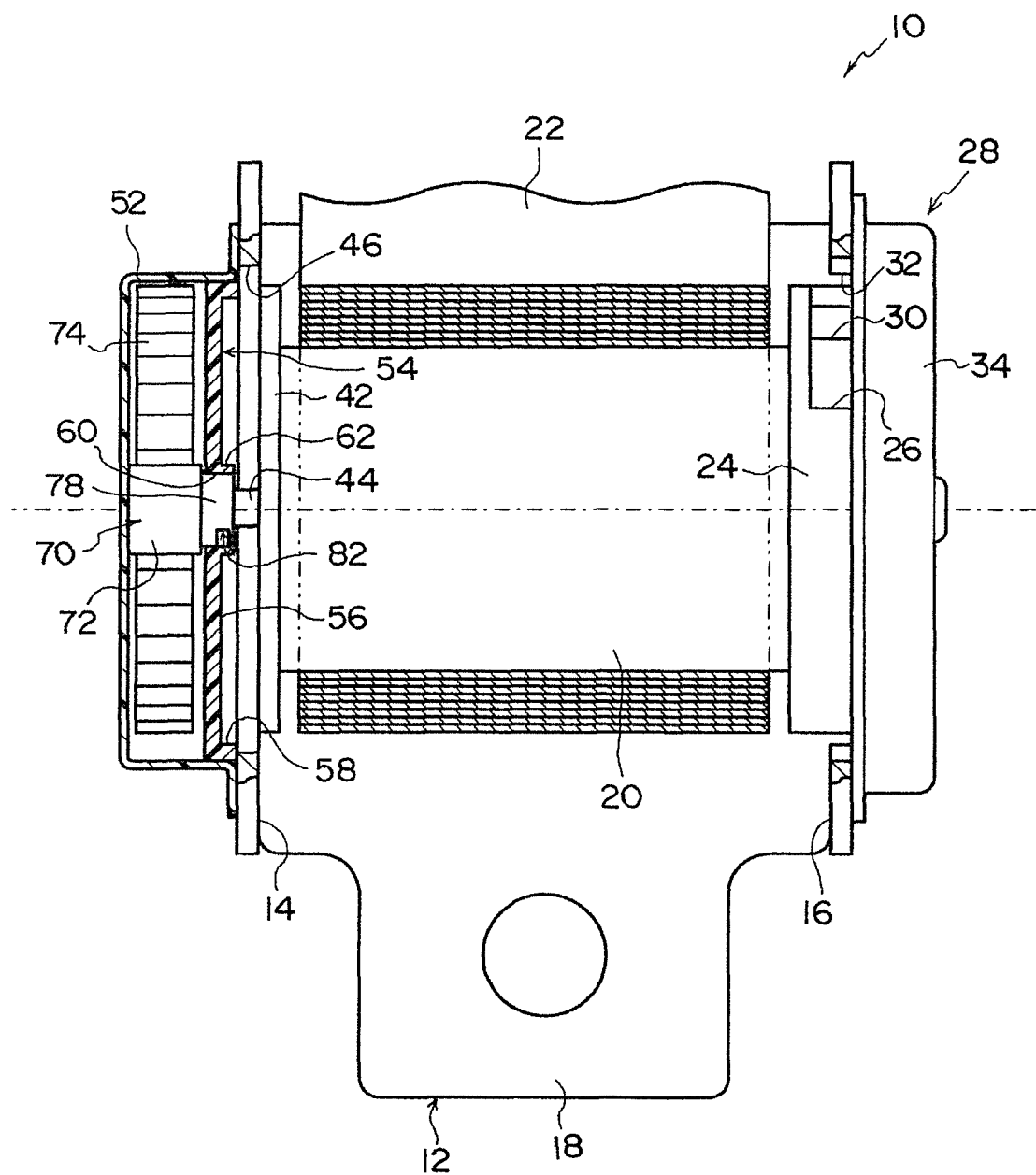
FIG. 3 is a front sectional view schematically illustrating an overall structure of the webbing take-up device according to the embodiment of the present invention.

FIG. 3 shows a structure of a webbing take-up device 10 according to an embodiment of the present invention by a front sectional view. As illustrated in FIG. 3, the webbing take-up device 10 includes a frame 12. The frame 12 includes a pair of leg plates 14 and 16 facing each other in respective thickness directions. A back plate 18 couples end portions on a vehicle upper side of those plates 14 and 16 with each other. As a whole, the frame 12 has a recessed shape so as to open toward an extending direction in which each of the leg plates 14 and 16 extends from the back plate 18.

Further, as illustrated in FIG. 3, a spool 20 is provided between the leg plate 14 and the leg plate 16 of the frame 12. The spool 20 is formed in a nearly columnar cylindrical shape so as to extend in an axial direction along a facing direction in which the leg plate 14 and the leg plate 16 face each other. A proximal end side in longitudinal-direction of a webbing belt 22 formed in a long-belt-like shape is caught with the spool 20. When the spool 20 is rotated in a take-up direction, which is one direction around a central axis thereof (dashed-dotted line Cl in FIG. 3), the webbing belt 22 is taken up from the proximal end side thereof by the spool 20 and stored therein. When the webbing belt 22 is pulled to a leading end side thereof, the webbing belt 22 which has been taken-up by the spool 20 is drawn out, and the spool 20 is rotated in a drawing-out direction opposite to the take-up direction.

Meanwhile, a lock base 24 is formed integrally with one end portion in axial-direction of the spool 20 (end portion on a leg-plate 16 side). The lock base 24 is formed in a disk-like shape coaxially with the spool 20. A pawl-accommodating portion 26 is formed in the lock base 24. The pawl-accommodating portion 26 is a hole portion opening at least at a part of an outer periphery of the lock base 24, and a lock pawl 30 constituting a lock mechanism 28 is accommodated inside of the pawl-accommodating portion 26.

The lock pawl 30 faces an inner peripheral portion of a ratchet hole 32 formed in the leg plate 16 along a rotational radial direction of the spool 20. When a leading end side of the lock pawl 30 goes out from the pawl-accommodating portion 26, lock teeth formed on the lock pawl 30 mesh with ratchet teeth of the ratchet hole 32. In this manner, when the lock teeth of the lock pawl 30 mesh with the ratchet teeth of the ratchet hole 32, rotation in the drawing-out direction of the lock base 24, eventually, rotation in the drawing-out direction of the spool 20 is regulated.

Meanwhile, outside of the leg plate 16 (opposite side of leg plate 16 with respect to leg plate 14), a housing 34 is attached to the leg plate 16. The housing 34 is formed in a box-like shape or a tubular shape with bottom opening to the leg-plate 16 side. Inside of the housing 34, various components are accommodated, the components constituting, what is called a "VSIR mechanism" which acts when acceleration at the time of vehicle deceleration reaches a predetermined magnitude or higher, and what is called a "WSIR mechanism" which acts when rotational acceleration of the spool 20 in the drawing-out direction reaches a predetermined magnitude or higher, and so on.

Further, a shaft portion formed to project coaxially with the spool 20 from the lock base 24 is inserted in the housing 34. A leading end of the shaft portion is supported at the housing 34 rotatably about the central axis of the spool 20 (dashed-dotted line C1 in FIG. 3).

Meanwhile, a flange portion 42 is made to extend outward of the rotational radial direction of the spool 20 from another end portion in axial-direction of the spool 20 (end portion on a leg-plate 14 side). The flange portion 42 is formed in a circular shape coaxially with the spool 20. Further, a shaft portion 44 is formed to project from the other end portion in axial-direction of the spool 20, at which the flange portion 42 is formed. A leading end side of the shaft portion 44 projects to an outside of the leg plate 14 through a through-hole 46 formed in the leg plate 14.

Further, on the outside of the leg plate 14 (opposite side of the leg plate 14 with respect to the leg plate 16), a spring cover 52 is attached to the leg plate 14. The spring cover 52 is formed in a box-like shape or a tubular shape with bottom opening to the leg-plate 14 side, and an opening end thereof is closed by a spring seat 54. The spring seat 54 includes a base portion 56, a thickness direction thereof being along the axial direction of the spool 20. From an outer peripheral portion of the base portion 56, a peripheral wall 58 is made to extend toward a spool 20 side. An outer peripheral shape of the peripheral wall 58 corresponds to an inner peripheral shape of the spring cover 52. Thus, fitting the peripheral wall 58 to an inside of the spring cover 52 causes the opening end of the spring cover 52 to be closed.

Further, in the base portion 56, a circular hole 60 coaxially with the spool 20 is formed. From a rim (peripheral edge) of the circular hole 60, a cylindrical-shaped boss 62 having the same inner peripheral shape as the inner peripheral shape of the circular hole 60 is made to extend toward the spool 20 side.

An adapter 70 is arranged between the spring seat 54 and a bottom portion of the spring cover 52. The adapter 70 includes a spring-engagement (spring-catching) portion 72. The spring-engagement portion 72 is formed in a columnar cylindrical shape coaxially with the spool 20, and supported rotatably and coaxially with respect to the spool 20 by the spring cover 52. A spiral spring 74 as an urging section is provided on an outside of the spring-engagement portion 72. With respect to the spiral spring 74, an outside end portion in spiral-direction thereof is caught with an catching piece 76 formed on the inside of the spring cover 52, and an inside end portion in spiral-direction is caught with the spring-engagement portion 72. The spiral spring 74 is wound up when the adapter 70 is rotated in the drawing-out direction, and hence an urging force with which the adapter 70 is urged in the take-up direction increases.

Figure 1:
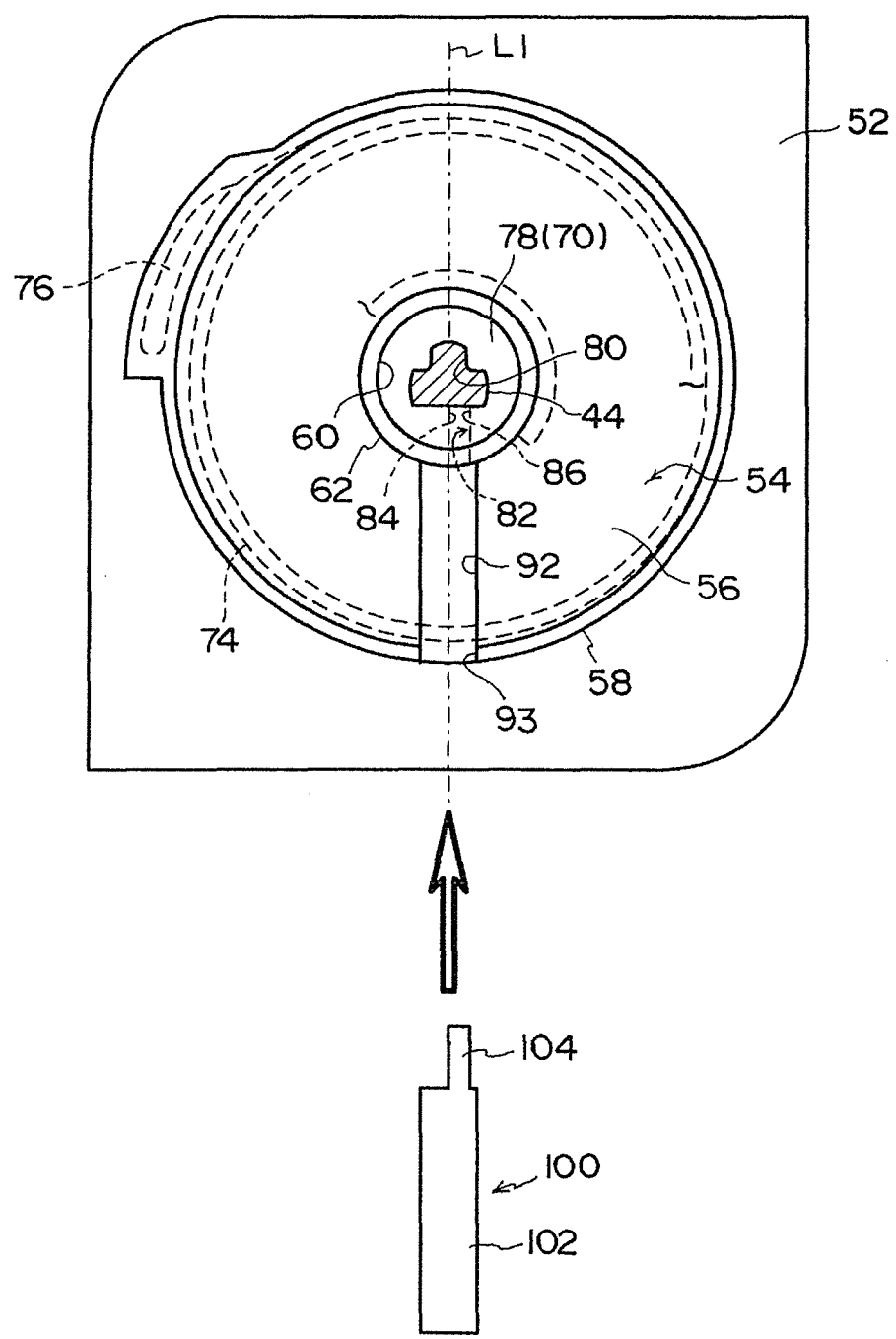
FIG. 1 illustrates a spring seat and an adapter which are viewed from an opening side of a spring cover of a webbing take-up device according to an embodiment of the present invention.

A shaft fit-insertion portion 78 is formed in the end portion on the spool 20 side of the spring-engagement portion 72. The shaft fit-insertion portion 78 is formed in a columnar cylindrical shape of which an outer diameter dimension is smaller than that of the spring-engagement portion 72, and formed coaxially with the spring-engagement portion 72. As illustrated in FIG. 1, a fit-insertion hole 80 is formed in the shaft fit-insertion portion 78. The fit-insertion hole 80 is formed so that inner peripheral shape thereof is in a non-circular, and opens in a face opposite the side of the spring-engagement portion 72 in the shaft fit-insertion portion 78. At least the leading end side of the above-mentioned shaft portion 44 is formed in a non-circular shape so as to be capable of being fit-inserted into the fit-insertion hole 80. By the leading end side of the shaft portion 44 being inserted into the fit-insertion hole 80, the spool 20 and the adapter 70 are coupled in a state that relative rotation is impossible.

Figure 2:
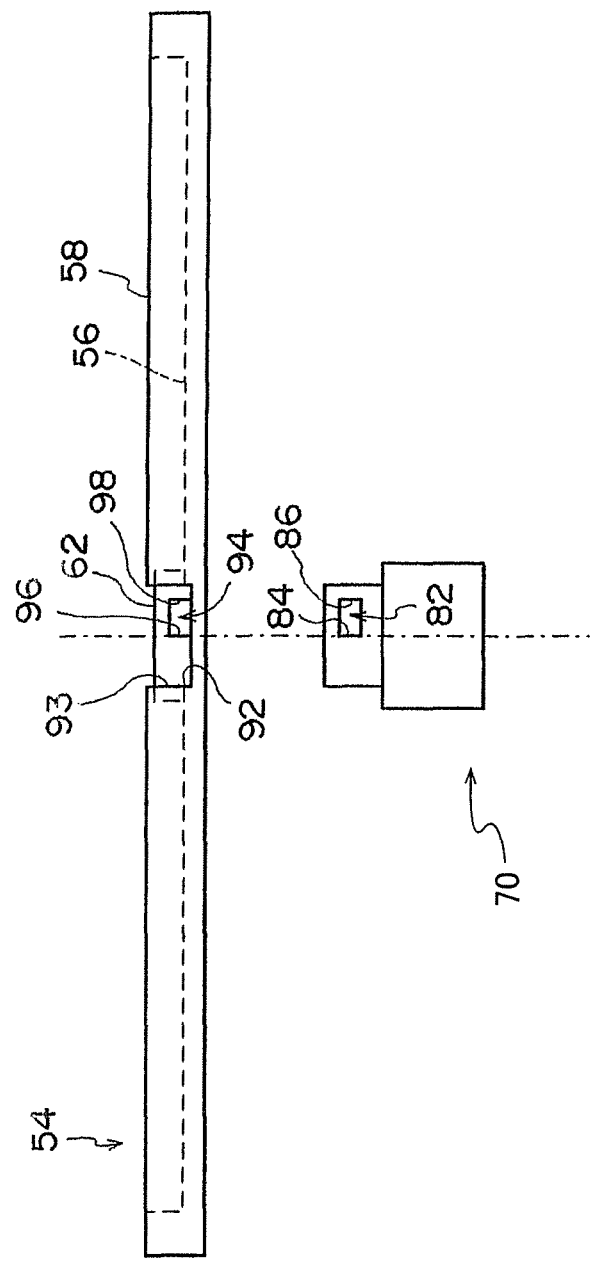
FIG. 2 is a side view of the spring seat and the adapter of the webbing take-up device according to the embodiment of the present invention.

Meanwhile, as illustrated in FIG. 1, an insertion hole 82 as an insertion portion is formed in the shaft fit-insertion portion 78 of the adapter 70. As illustrated in FIG. 2, the insertion hole 82 is formed as a rectangular hole which opens in an outer peripheral portion of the shaft fit-insertion portion 78. As illustrated in FIG. 1, the insertion hole 82 includes side walls 84 and 86 facing each other in a direction orthogonal to an axial direction of the adapter 70.

Among the side walls 84 and 86, a wall surface of the side wall 84 positioned on relatively drawing-out-direction side is parallel to an virtual straight line L1 passing a center of the adapter 70, and in addition, is positioned on the virtual straight line L1. In contrast, among the side walls 84 and 86, a wall surface of the side wall 86 positioned on relatively take-up-direction side is also parallel to the above-described virtual straight line L1, however, as a matter of course, the side wall 86 is positioned on the take-up-direction side relative to the virtual straight line L1. Thus, a center (center line) between the side wall 84 and the side wall 86 is offset toward the take-up-direction side relative to the virtual straight line L1.

The virtual straight line L1 is a line extending from the rotation center of the adapter 70 toward a side of the opening of the insertion hole 82 and being parallel to at least the side wall 84.

As illustrated in FIG. 1, a stopper holding groove 92 is formed in the base portion 56 of the spring seat 54 in correspondence with the insertion hole 82. The stopper holding groove 92 is a groove, a longitudinal direction thereof being along a radial direction of which a center is the boss 62, and opens in a surface on the spool 20 side of the base portion 56. A cutout 93 is formed in the peripheral wall 58 in correspondence with an end portion on an outer-peripheral-portion side of the base portion 56 in the stopper holding groove 92. The stopper holding groove 92 opens also in an outer peripheral portion of the spring seat 54.

Further, an end portion on a boss 62 side of the stopper holding groove 92 connects a through-hole 94 formed in the boss 62. As illustrated in FIG. 2, the through-hole 94 is a rectangular hole similar to the insertion hole 82, and opens in both an inner peripheral portion and an outer peripheral portion of the boss 62. The through-hole 94 includes side walls 96 and 98 facing each other in the direction orthogonal to the axial direction of the adapter 70.

As illustrated in FIGS. 1 and 2, among the side walls 96 and 98, a wall surface of the side wall 96 positioned on relatively drawing-out-direction side is parallel to the virtual straight line L1 passing the center of the adapter 70, in addition, is positioned on the virtual straight line L1. In contrast, among the side walls 96 and 98, a wall surface of the side wall 98 positioned on relatively take-up-direction side is also parallel to the virtual straight line L1, however, as a matter of course, the side wall 98 is positioned on the take-up-direction side relative to the virtual straight line L1. Thus, similarly to the side walls 84 and 86 of the insertion hole 82, a center between the side wall 96 and the side wall 98 is offset to the take-up-direction side relative to the virtual straight line L1.

A proximal (base) portion 102 of a stopper 100 fits to the above-mentioned stopper holding groove 92. The proximal portion 102 is formed in a rectangular plate-like shape so as to have a width dimension nearly equal to an inner width dimension of the stopper holding groove 92, and an insertion piece 104 is made to extend from a leading end in longitudinal-direction of the proximal portion 102. The insertion piece 104 has a width dimension equal to a distance between the side wall 96 and the side wall 98 of the through-hole 94 and to a distance between the side wall 84 and the side wall 86 of the insertion hole 82, and is formed so that insertion piece 104 passes through the through-hole 94 under a state in which the proximal portion 102 is fitted to the stopper holding groove 92.

Further, an extension dimension of the insertion piece 104 extending from the proximal portion 102 is longer than a length of the through-hole 94 (length from an end portion of the through-hole 94 in the outer peripheral portion of the boss 62 to an end portion of the through-hole 94 in the inner peripheral portion of the boss 62). Under a state in which the through-hole 94 and the insertion hole 82 communicates to each other, the insertion piece 104 projecting from the end portion of the through-hole 94 in the inner peripheral portion of the boss 62 enters the insertion hole 82.

Functions and Advantages of the Present Embodiment

Next, description is made of operation and effect of the present embodiment.

In the webbing take-up device 10, at a time where the adapter 70 and the shaft portion 44 of the spool 20 are coupled to each other, the spring cover 52, the adapter 70, the spiral spring 74, and the spring seat 54 are assembled to each other in advance. Upon assembling the adapter 70, the spiral spring 74, and the spring seat 54 to the spring cover 52, the adapter 70 is caused to rotate in the drawing-out direction so that an urging force in the take-up direction is generated in the spiral spring 74. In this state, the stopper 100 enters the stopper holding groove 92 from the cutout 93 of the spring seat 54. When the proximal portion 102 of the stopper 100 fits to the stopper holding groove 92, the proximal portion 102 is moved toward the boss 62 side while being guided by the stopper holding groove 92.

The stopper 100 is moved toward the boss 62 side in this manner, then, the insertion piece 104 enters the through-hole 94. In this state, the through-hole 94 and the insertion hole 82 are made to face each other, with the urging force of the spiral spring 74 being maintained. Then, the insertion piece 104 having passed through the through-hole 94 enters the insertion hole 82. In this state, if the adapter 70 attempts to rotate with the urging force of the spiral spring 74 in the take-up direction, the insertion piece 104 of the stopper 100 interferes with the side wall 84 of the insertion hole 82. In this way, the rotation of the adapter 70 in the take-up direction is regulated, and the adapter 70 is held with the urging force generated by the spiral spring 74 being maintained. In this state, the shaft portion 44 of the spool 20 is coupled to the adapter 70.

Figure 4B:
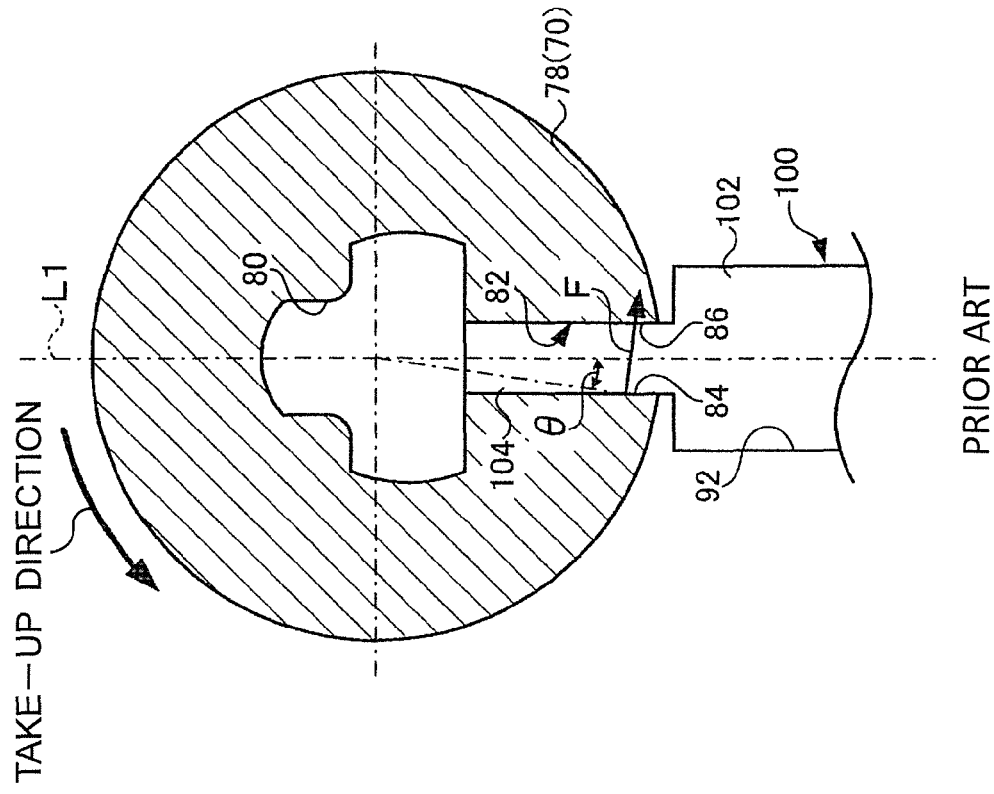
FIG. 4A and FIG. 4B are enlarged sectional views for comparison between a main part of the webbing take-up device according to the embodiment of the present invention and a main part of a conventional structure; specifically.
Figure 4A:
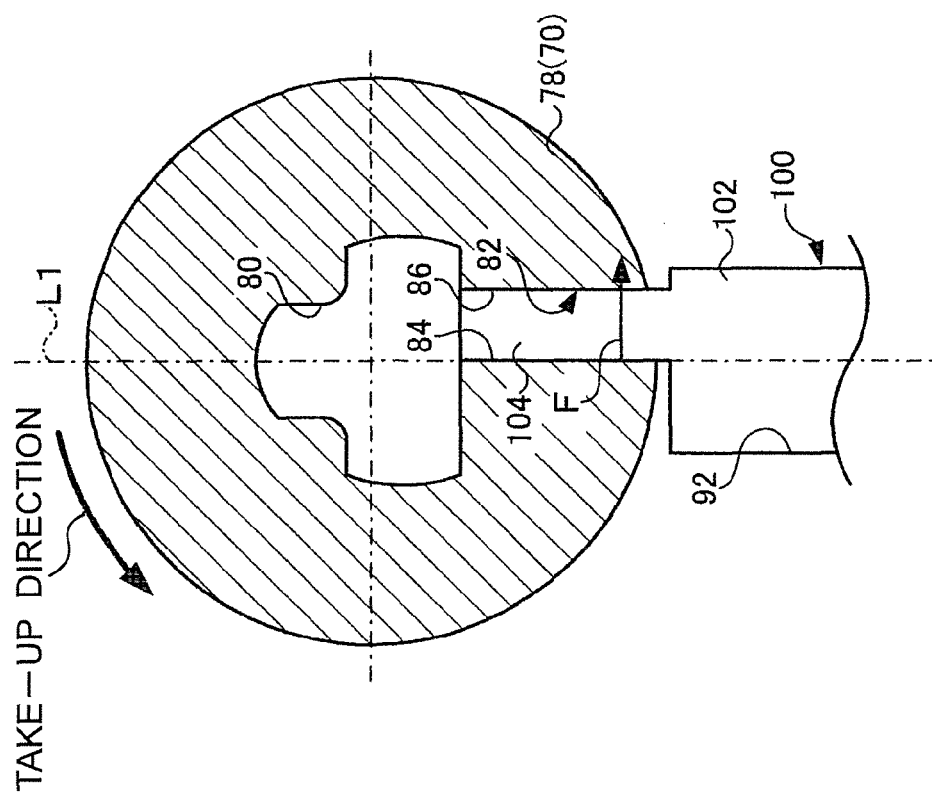

Here, FIG. 4A shows an enlarged sectional view of the insertion hole 82 of the adapter 70 in the webbing take-up device 10 according to the present embodiment and a vicinity of the insertion hole 82. FIG. 4B illustrates a conventional structure corresponding to the structure of FIG. 4A. Note that, although FIG. 4B is for explaining the conventional structure, for the sake of convenience in description, components therein are denoted by the same reference symbols as those in the present embodiment.

As illustrated in FIG. 4B, in the conventional structure, the above-mentioned virtual straight line L1 passes a width-direction center of the insertion hole 82. Thus, the side wall 84 which comes in contact with the insertion piece 104 from the drawing-out-direction side is positioned on the drawing-out-direction side relative to the virtual straight line L1. Thus, a line (inclined dashed line in FIG. 4B) connecting the center of the adapter 70 and a contact position of the insertion piece 104 and the side wall 84 is inclined at an angle θ with respect to the virtual straight line L1.

Here, a direction of a pressing force F exerted when the urging force of the spiral spring 74 causes the wall surface of the side wall 84 to press the insertion piece 104 is a tangential direction at the contact position of the side wall 84 and the insertion piece 104. Thus, in such a conventional structure, the pressing force F direction is inclined outward in a rotational radial direction of the adapter 70 with respect to a direction of the wall surface of the side wall 84 with the above-described angle θ. In this manner, due to the pressing force F direction is inclined outward in the rotational radial direction of the adapter 70 with respect to the direction of the wall surface of the side wall 84, the insertion piece 104 may be extruded from the insertion hole 82 by the pressing force F.

In contrast, as illustrated in FIG. 4A, in the webbing take-up device 10 according to the present embodiment, the center between the side wall 84 and the side wall 86 is offset to the take-up-direction side relative to the virtual straight line L1. Among the side walls 84 and 86, the wall surface of the side wall 84 positioned on relatively drawing-out-direction side is positioned on the virtual straight line L1. As described above, the direction of the pressing force F exerted when the urging force of the spiral spring 74 causes the wall surface of the side wall 84 to press the insertion piece 104 is the tangential direction at the contact position of the side wall 84 and the insertion piece 104. Here, the contact position of the side wall 84 and the insertion piece 104 is positioned on the virtual straight line L1. As a result, the direction of the pressing force F is orthogonal to the virtual straight line L1, in other words, the direction of the pressing force F is not inclined outward in the radial direction of the adapter 70.

In this way, the pressing force applied from the wall surface of the side wall 84 to the insertion piece 104 of the stopper 100 does not cause the insertion piece 104 to be extruded from the insertion hole 82. Thus, an insertion state of the insertion piece 104 to the insertion hole 82 can be satisfactorily maintained.

Figure 5A:
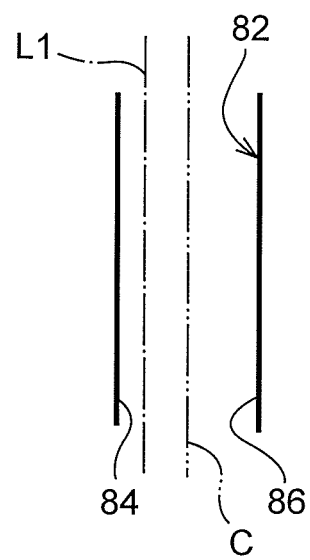
FIG. 5A and FIG. 5B are views for illustrating the main parts of the webbing take-up device according to a modified embodiment of the present invention with reference to FIG. 4A.
Figure 5B:
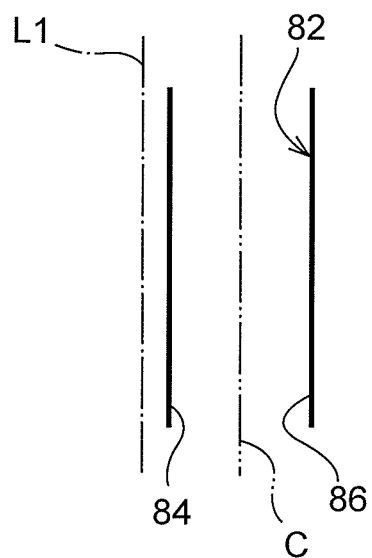

Note that, in the present embodiment, although the insertion hole 82 is formed such that the wall surface of the side wall 84 is positioned on the virtual straight line L1, as long as the center between the side wall 84 and the side wall 86 is offset toward the take-up-direction side relative to the virtual straight line L1 under a state in which the wall surface of the side wall 84 is parallel to the virtual straight line L1, the wall surface of the side wall 84 and the virtual straight line L1 do not need to coincide. In other words, the insertion hole 82 may be formed such that the virtual straight line L1 passes between the side wall 84 and the center (center line C) between the side wall 84 and the side wall 86 under the state in which the wall surface of the side wall 84 is parallel to the virtual straight line L1 (FIG. 5A). Alternatively, the insertion hole 82 may be formed such that the virtual straight line L1 passes on the drawing-out-direction side relative to the insertion hole 82 under the state in which the wall surface of the side wall 84 is parallel to the virtual straight line L1 (FIG. 5B).

What is claimed is:

1. A webbing take-up device comprising:
   a spool to which a base end side, of a webbing belt having a long belt shape, in a longitudinal direction of the webbing belt is coupled, the spool taking up the webbing belt from the base end side in the longitudinal direction by rotating in a take-up direction to store the webbing belt thereon, the take-up direction being one direction about an axis of the spool;
   an adapter to which the spool is coupled directly or indirectly at one end side in an axial direction of the spool so as to rotate integrally with the spool;
   an insertion portion formed in the adapter and having
      an opening opened at an outer peripheral portion of the adapter, and
      wall portions facing each other in a direction orthogonal to both of a rotation axis direction of the adapter and a direction from a rotation center of the adapter to the opening,
   rotation of the adapter being regulated by a stopper, that is inserted from the opening into the insertion portion, interfering with the wall portions; and
      an urging member whose one end is coupled to the adapter, that urges the adapter in the take-up direction with an urging force, the urging force being increased by the adapter being rotated in a drawing-out direction opposite to the take-up direction,
   wherein a center between one of the wall portions and the other of the wall portions of the insertion portion is offset toward the take-up direction side with respect to a virtual line passing through the rotation center of the adapter and the opening of the insertion portion.

2. The webbing take-up device of claim 1, wherein one of the wall portions of the insertion portion, which is located at the drawing-out direction side, is formed on the virtual line or formed at a position further toward the take-up direction side than the virtual line.

3. The webbing take-up device of claim 2, wherein the wall portions are formed parallel to the virtual line.

4. The webbing take-up device of claim 2, wherein the rotation of the adapter in the take up direction is regulated due to the stopper, inserted from the opening into the insertion portion, interfering with the one of the wall portions, which is located at the drawing-out direction side.

5. The webbing take-up device of claim 1, wherein the wall portions are formed parallel to the virtual line.

6. A webbing take-up device comprising:
   a spool to which a base end side, of a webbing belt having a long belt shape, in a longitudinal direction of the webbing belt is coupled, the spool taking up the webbing belt from the base end side in the longitudinal direction by rotating in a take-up direction to store the webbing belt thereon, the take-up direction being one direction about an axis of the spool;
   an adapter to which the spool is coupled directly or indirectly at one end side in an axial direction of the spool so as to rotate integrally with the spool;
   an insertion portion formed in the adapter and having
      an opening opened at an outer peripheral portion of the adapter, and
      wall portions facing each other in a direction orthogonal to both of a rotation axis direction of the adapter and a direction from a rotation center of the adapter to the opening,
   rotation of the adapter being regulated by a stopper, that is inserted from the opening into the insertion portion, interfering with the wall portions; and
      an urging member whose one end is coupled to the adapter, that urges the adapter in the take-up direction with an urging force, the urging force being increased by the adapter being rotated in a drawing-out direction opposite to the take-up direction,
   wherein a center between one of the wall portions and the other of the wall portions of the insertion portion is offset toward the take-up direction side with respect to a virtual line which extends from the rotation center of the adapter toward a side of the opening of the insertion portion and is parallel to at least one of the wall portions.

7. The webbing take-up device of claim 6, wherein one of the wall portions of the insertion portion, which is located at the drawing-out direction side, is formed on the virtual line or formed at a position further toward the take-up direction side than the virtual line.

8. The webbing take-up device of claim 7, wherein the wall portions are formed parallel to the virtual line.

9. The webbing take-up device of claim 7, wherein the rotation of the adapter in the take up direction is regulated due to the stopper, inserted from the opening into the insertion portion, interfering with the one of the wall portions, which is located at the drawing-out direction side.

10. The webbing take-up device of claim 6, wherein the wall portions are formed parallel to the virtual line.

* * * * *